(12) United States Patent
Aldersley et al.

(10) Patent No.: US 11,993,961 B2
(45) Date of Patent: May 28, 2024

(54) STRIKER OF A MOTOR VEHICLE BODY LOCK, MOTOR VEHICLE BODY LOCK COMPRISING SUCH A STRIKER, AND CORRESPONDINGLY EQUIPPED MOTOR VEHICLE

(71) Applicant: Bayerische Motoren Werke Aktiengesellschaft, Munich (DE)

(72) Inventors: Nicholas Aldersley, Hebertshausen (DE); Michael Brandstaetter, Markt Schwaben (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 238 days.

(21) Appl. No.: 17/416,762

(22) PCT Filed: Dec. 3, 2019

(86) PCT No.: PCT/EP2019/083551
§ 371 (c)(1),
(2) Date: Jun. 21, 2021

(87) PCT Pub. No.: WO2020/156705
PCT Pub. Date: Aug. 6, 2020

(65) Prior Publication Data
US 2022/0074240 A1    Mar. 10, 2022

(30) Foreign Application Priority Data
Jan. 30, 2019  (DE) .................... 10 2019 102 391.2

(51) Int. Cl.
*E05B 77/38*  (2014.01)
*B62D 25/12*  (2006.01)
*E05B 85/04*  (2014.01)

(52) U.S. Cl.
CPC .............. *E05B 77/38* (2013.01); *B62D 25/12* (2013.01); *E05B 85/04* (2013.01)

(58) Field of Classification Search
CPC .. E05B 85/04; E05B 85/045; E05B 2015/027; E05B 15/022; E05B 2015/023; E05B 2015/0265; E05B 15/0295
See application file for complete search history.

(56) References Cited

U.S. PATENT DOCUMENTS

| | | | |
|---|---|---|---|
| 2013/0180991 A1* | 7/2013 | Williams | .............. E05B 85/045 292/341.15 |
| 2017/0152684 A1 | 6/2017 | Hundsdorfer | |

(Continued)

FOREIGN PATENT DOCUMENTS

| | | |
|---|---|---|
| CN | 104937194 A | 9/2015 |
| CN | 106574470 A | 4/2017 |

(Continued)

OTHER PUBLICATIONS

Computer Generated Translation for EP 410864 A, Generated on May 3, 2023, https://worldwide.espacenet.com/ (Year: 2023).*

(Continued)

*Primary Examiner* — Alyson M Merlino
(74) *Attorney, Agent, or Firm* — Crowell & Moring LLP

(57) ABSTRACT

A lock striker of a motor vehicle body lock includes a striker. The striker is arranged on a striker plate. The striker has a striker section which is configured to admit a load. The striker plate has a first striker plate section which is configured to be connected to a body component. The striker plate has a second striker plate section on which the striker is arranged. The first striker plate section and the second striker plate section are connected to one another. A stiffness of the striker plate in the direction of the load is less than in a direction orthogonal to the load.

11 Claims, 1 Drawing Sheet

(56) References Cited

U.S. PATENT DOCUMENTS

| | | | | |
|---|---|---|---|---|
| 2019/0277070 A1* | 9/2019 | Aldersley | ............... | E05B 85/04 |
| 2020/0040622 A1* | 2/2020 | Digel | ..................... | E05B 85/04 |
| 2022/0065004 A1* | 3/2022 | Aldersley | ............. | E05B 85/045 |
| 2022/0074240 A1* | 3/2022 | Aldersley | ............... | E05B 85/04 |

FOREIGN PATENT DOCUMENTS

| | | | | |
|---|---|---|---|---|
| DE | 690 00 865 T2 | | 8/1993 | |
| DE | 100 54 507 A1 | | 5/2002 | |
| DE | 20 2004 002 682 U1 | | 4/2004 | |
| DE | 103 08 371 A1 | | 9/2004 | |
| DE | 10327973 A1 | * | 1/2005 | ............. E05B 81/22 |
| DE | 102015208392 A1 | * | 11/2016 | ........... E05B 85/045 |
| EP | 0410864 A1 | * | 1/1991 | ......... E05B 15/0245 |
| EP | 2290177 A2 | * | 3/2011 | ........... E05B 85/045 |
| FR | 2 706 938 A1 | | 12/1994 | |

OTHER PUBLICATIONS

English translation of Chinese Office Action issued in Chinese Application No. 201980074409.9 dated Sep. 29, 2021 (six (6) pages).

International Search Report (PCT/ISA/210) issued in PCT Application No. PCT/EP2019/083551 dated Feb. 20, 2020 with English translation (four (4) pages).

German-language Written Opinion (PCT/ISA/237) issued in PCT Application No. PCT/EP2019/083551 dated Feb. 20, 2020 (six (6) pages).

German-language Search Report issued in German Application No. 10 2019 102 391.2 dated Dec. 13, 2019 with partial English translation (14 pages).

English translation of Chinese Office Action issued in Chinese Application No. 201980074409.9 dated May 7, 2022 (seven (7) pages).

* cited by examiner

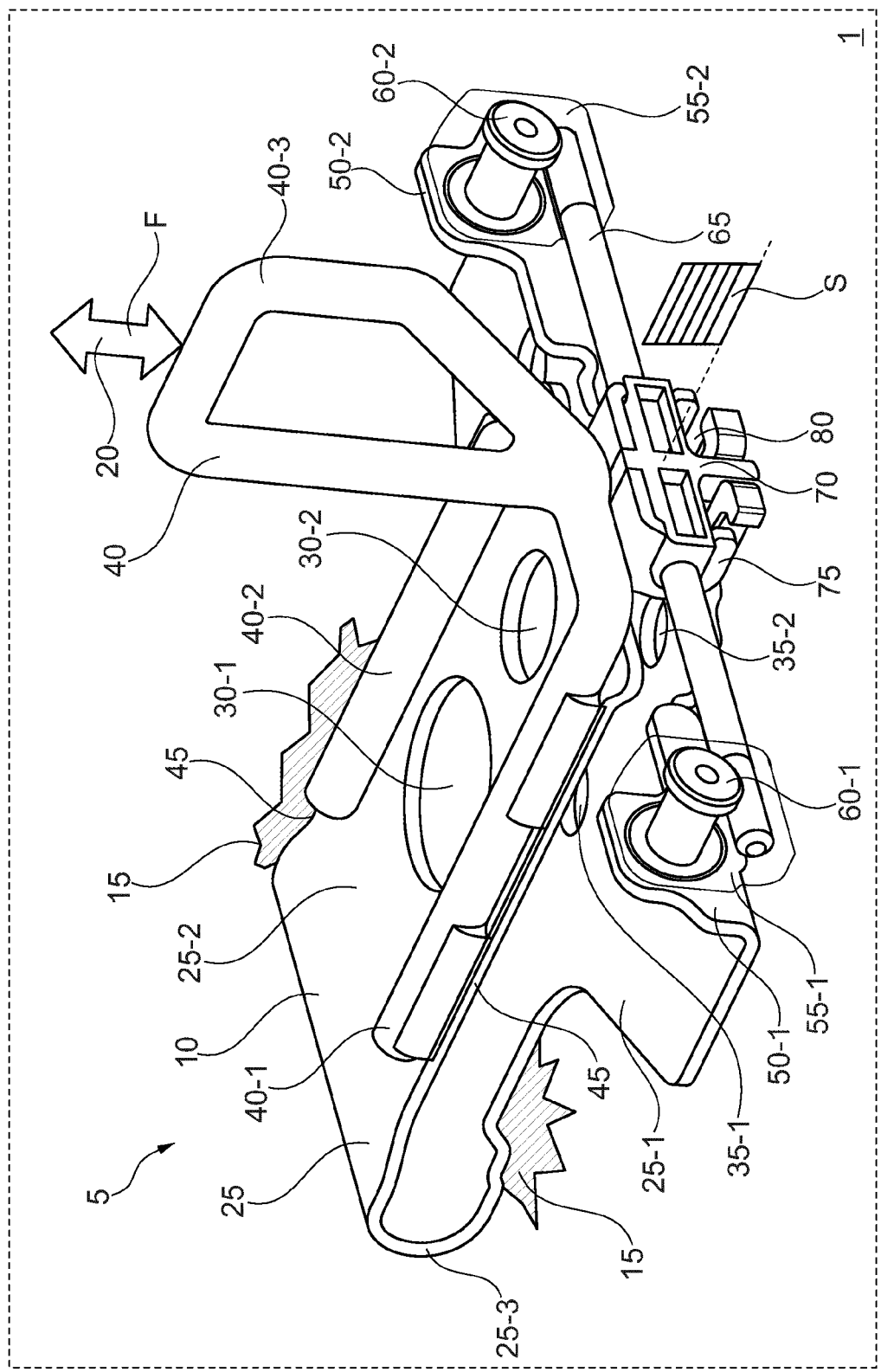

STRIKER OF A MOTOR VEHICLE BODY LOCK, MOTOR VEHICLE BODY LOCK COMPRISING SUCH A STRIKER, AND CORRESPONDINGLY EQUIPPED MOTOR VEHICLE

BACKGROUND AND SUMMARY OF THE INVENTION

The embodiments of the present invention relate to a lock striker for a motor vehicle body lock, to a motor vehicle body lock, which has a corresponding lock striker, and to a motor vehicle equipped therewith.

Lock strikers of motor vehicle body locks are used, in conjunction with corresponding hooks, for selectively releasing or closing in particular doors, front flaps or rear flaps. Here, on the one hand, moderate stiffness of the motor vehicle body lock in the closing direction thereof is sought, whereas, on the other hand, such moderate stiffness with respect to the relative transverse direction or vertical direction of said motor vehicle body lock is rather perceived as disadvantageous. To avoid disturbing noises and to compensate position tolerances of the stated parts, it is the case a vehicle body locks that lock strikers are equipped with elastic elements which act as vibratory decoupling means.

The decoupling means however have no particular differentiation of the stiffness in the stated directions, such that, in the development of a motor vehicle body lock, there is always a conflict of aims between a limitation of a vibratory decoupling action and the direction-dependent locking function of the lock striker.

It is an object of the embodiments of the present invention to specify a lock striker of a motor vehicle body lock, by means of which the stated conflict of aims can be alleviated.

Said object is achieved by means of a lock striker of the inventive motor vehicle body lock presented herein. Advantageous configurations are also specified herein.

The lock striker according to the embodiments of the invention of a motor vehicle body lock has a striker arranged on a striker plate, which striker in turn has a striker section which admits a load. The expression "striker" encompasses both strikers of closed form and strikers of open form.

The load represents in particular forces and moments which can arise at the motor vehicle body lock according to the embodiments of the invention in one of the functional situations presented below, without deficient functioning thereof occurring:

In a first functional situation, defined as rest situation, the lock striker is subjected to substantially no load (that is to say when a correspondingly equipped motor vehicle body lock is open) or is subjected to only a low load (that is to say when the motor vehicle body lock, proceeding from its opened state, is closed in the intended manner or, proceeding from its closed state, is opened in the intended manner).

In a second functional situation, defined as operating position, a component which is closed by means of the lock striker, in particular a rear flap, is locked, and a correspondingly equipped motor vehicle is at a standstill or is in an intended driving state.

In a third functional situation, the motor vehicle body lock is subjected to a highly dynamic acceleration, which arises in particular during a highly dynamic closure of the motor vehicle body lock. This type of closure is caused by an improper movement, caused in particular by a person, of a component that engages into the motor vehicle body lock, such that this type of closure is sometimes also referred to as violent closure. Whereas a proper closing process involves a closing speed of up to approximately 1.4 m/s, the closing speed in the case of a violent closure is higher than this, and is higher than 1.9 m/s.

In a fourth functional situation, the motor vehicle body lock is subjected to an accident-induced highly dynamic acceleration in which the load factor is 30 g. The fourth functional situation can also be referred to as "crash situation".

According to the embodiments of the invention, the motor vehicle body lock has a striker plate with a first striker plate section which is connected to a body component, in particular a hook situated on a front flap or on a rear flap, in one of the functional situations. The striker plate furthermore has a second striker plate section, on which the striker is situated. The first striker plate section and the second striker plate section are connected, preferably elastically, to one another, and such that the stiffness of the striker plate in the direction of the load is less than in a direction orthogonal to the load.

It is advantageously possible in this way, using simple means, to create desired direction-dependent stiffness of the motor vehicle body lock.

According to an embodiment, the stiffness of the striker plate in the direction of the load is at least two times less than in a direction orthogonal to the load.

The construction of the lock striker according to the embodiments of the invention is advantageously further simplified when the first striker plate section and the second striker plate section form the limbs of a U or of a V.

In accordance with the basic principle, it is possible for the stiffness in a transition region from the first striker plate section to the second striker plate section to be attained by means of a separate additional means which connects said two striker plate sections to one another and which has a desired stiffness. The first striker plate section and the second striker plate section are however advantageously formed as a single piece, wherein the desired stiffness is attained by means of a suitable combination of the geometry of the transition region of the two striker plate sections and the material thereof, which is preferably a spring steel. In accordance with the basic principle, the relative arrangement of the two striker plate sections with respect to one another is likewise freely selectable. It may however advantageously be provided that the first striker plate section and the second striker plate section are oriented as mutually parallel limbs of the U.

According to an embodiment, it is provided that the first striker plate section has a first extreme end and, spaced apart from the latter, a second extreme end, on which extreme ends there is received a spring means. In this way, a mechanical coupling of the first striker plate and of the second striker plate is advantageously created, which mechanical coupling, by way of the spring means, provides a simple facility for setting a desired stiffness of the motor vehicle body lock. Furthermore, in this way, it is advantageously possible for the lock striker according to the embodiments of the invention to be easily produced inexpensively on a mass scale but in an individualized manner: whereas the two striker plates are manufactured in similar or even identical form in large unit quantities, an individualization of the lock striker is realized by way of specific spring means. In other words, a mass-produced series of lock strikers according to the embodiments of the invention can, with a large number of similar or identical striker plates, be adapted to a particular intended use or location of use through suitable selection of spring means.

The abovementioned advantages are all the more applicable when the spring means, according to an embodiment, is operatively connected by way of a connecting section to the second striker plate section.

The desired mechanical action of the lock striker according to the embodiments of the invention is advantageously further improved in that the connecting section is received in a receptacle situated on the second striker plate section, wherein a damping means, particularly preferably a damping means manufactured from a plastic, in particular from a polymer, is situated on the connecting section and/or the receptacle. The above-discussed individualization or adaptation, in a mass production context, of the lock striker according to the embodiments of the invention can furthermore be further simplified or implemented through suitable selection of a damping means.

A lock striker which is particularly easy and inexpensive to produce is advantageously created if the spring means is formed in the manner of a cantilever. The above-discussed individualization or adaptation, in a mass production context, of the lock striker according to the embodiments of the invention is further simplified through suitable selection of the spring means material and the geometry thereof.

According to an embodiment, the spring means has a first end section and a second end section, wherein the first end section is fastened by a first end section receiving means and the second end section is fastened by a second end section receiving means to the first extreme end and to the second extreme end respectively. In this way, an easily configured fastening of the spring means is advantageously created, the stiffness of which can be easily further adapted by selection of a desired first end section receiving means and/or second end section receiving means. It is thus possible in particular, through suitable selection of the stated means, to achieve that the spring means is received in a play-free manner.

According to an embodiment, the striker has a first striker limb and, parallel to the latter, a second striker limb, which striker limbs are oriented symmetrically with respect to one another and with respect to a respective edge section of the second striker plate section, wherein the striker section projects orthogonally with respect to said striker limbs. Particularly straightforward installation of the striker on the second striker plate section is made possible in this way.

Particularly inexpensive installation of the lock striker according to the embodiments of the invention is made possible if at least one aperture is situated in the second striker plate section between the first striker limb and the second striker limb, which at least one aperture is arranged in alignment with respect to at least one aperture situated in the first striker plate section. In such a case, a fastening means which fastens the first striker plate to a body part, in particular a screw, can be easily guided through the aperture in the second striker plate in the direction of the first striker plate.

The object stated further above is likewise achieved by means of a motor vehicle body lock which has a lock striker of the abovementioned type. The advantages presented above apply appropriately.

The object stated further above is likewise achieved by means of a motor vehicle which has at least one motor vehicle body lock of the type disclosed above. The advantages presented above apply appropriately.

Other objects, advantages and novel features of the embodiments of the present invention will become apparent from the following detailed description of one or more preferred embodiments when considered in conjunction with the accompanying drawing, in which:

BRIEF DESCRIPTION OF THE DRAWING

FIG. 1 is a simplified perspective view of a motor vehicle body lock 5 which is installed on a symbolically illustrated motor vehicle 1 and which has a lock striker 10.

DETAILED DESCRIPTION OF THE DRAWING

The motor vehicle body lock 10 of this exemplary embodiment is fastened by means of screws (not shown here) to a partially shown body component 15 formed as a metal sheet, for example of a front hood, and serves for the connection of a hook 20, which is illustrated merely symbolically here.

For this purpose, the motor vehicle body lock 10 has a striker plate 25 which comprises a first striker plate section 25-1, which is adjacent to the body component 15, and a second striker plate section 25-2, which is substantially parallel to said first striker plate section. The first striker plate section 25-1 and the second striker plate section 25-2 are connected to one another at a connecting section 25-3 such that, as seen in side view, they form a U-shaped configuration. The fastening mentioned is carried out by means of two screws (not shown here) which are moved through apertures 30-1 and 30-2 provided in the second striker plate section 25-2 in the direction of apertures 35-1 and 35-2, which are arranged in alignment in the first striker plate section 25-1, and come to bear against said first striker plate section 25-1. Alternatively, provision may be made to fasten a crash securing means (not shown here) which is essentially mushroom-shaped or in the form of a T-shaped bolt in the aperture 35-2, which crash securing means extends through the aperture 30-2 without bearing on the latter outside the crash situation, and the head underside of which crash securing means is a few millimeters away from the second striker plate section 25-2.

The motor vehicle body lock 10 furthermore has a striker 40 with a first striker limb 40-1, a second striker limb 40-2 parallel to said first striker limb, and a striker section 40-3, on which the hook 20 engages and exerts a load F when the motor vehicle body lock 10 is closed. The first striker limb 40-1 and the second striker limb 40-2 are oriented symmetrically with respect to one another and with respect to a respective edge section 45 of the second striker plate section 25-2 (cf. plane of symmetry S). The striker section 40-3 projects substantially orthogonally with respect to said striker limbs and with respect to the second striker plate section 25-2.

The first striker plate section 25-1 comprises a first extreme end 50-1 and, spaced apart from the latter, a second extreme end 50-2, which extreme ends project in each case substantially orthogonally with respect to the former in the same direction as the striker section 40-3. A first end section receiving means 55-1 illustrated in transparent form is fastened by a fastening means 60-1 to the first extreme end 50-1 which is on the left in the figure. A second end section receiving means 55-2 illustrated in transparent form is fastened by a further fastening means 60-2 to the second extreme end 50-2 which is on the right in the figure. The first end section receiving means 55-1 and the second end section receiving means 55-2 are made from a plastic and support in each case one first end section of a spring means 65 which is formed in the manner of a cantilever and which is manufactured from a spring steel. The spring means 65 has, in its central region, a damping means 70 which is formed from a plastic or rubber and which is received under preload in a connecting section 75 situated on the second striker plate section 25-2; the connecting section 75 is consequently formed as a receptacle 80. Those ends of the first striker plate section 25-1 and of the second striker plate section 25-2 which are remote from the connecting section 25-3 are elastically operatively connected to one another by means of said connecting section.

A desired vibrational characteristic of the motor vehicle body lock 5 according to the embodiments of the invention can advantageously be easily generated through suitable selection of the materials and geometry of the above-described elements, in particular of the dimensions thereof.

LIST OF REFERENCE DESIGNATIONS

1 Motor vehicle
5 Motor vehicle body lock
10 Lock striker
15 Body component
20 Hook
25 Striker plate
25-1 First striker plate section
25-2 Second striker plate section
25-3 Connecting section
30-1 Aperture
30-2 Aperture
35-1 Aperture
35-2 Aperture
40 Striker
40-1 First striker limb
40-2 Second striker limb
40-3 Striker section
45 Edge section
50-1 First extreme end
50-2 Second extreme end
55-1 First end section receiving means
55-2 Second end section receiving means
60-1 Fastening means
60-2 Fastening means
65 Spring means
70 Damping means
75 Connecting section
80 Receptacle
F Load
S Plane of symmetry

What is claimed is:

1. A lock striker of a motor vehicle body lock, the lock striker comprising:
 a striker that is arranged on a striker plate, the striker having a striker section which is configured to admit a load, wherein
 the striker plate has a first striker plate section which is configured to be connected to a body component,
 the striker plate has a second striker plate section on which the striker is arranged,
 the first striker plate section and the second striker plate section are connected to one another, and
 a stiffness of the striker plate itself, in a direction of the load is less than in a direction orthogonal to the direction of the load.

2. The lock striker according to claim 1, wherein the first striker plate section and the second striker plate section form the limbs of a generally U shape or of a generally V shape.

3. The lock striker according to claim 2, wherein the first striker plate section has a first extreme end and, spaced apart from the first extreme end, a second extreme end, on which first and second extreme ends there is received a spring means.

4. The lock striker according to claim 3, wherein the spring means has a connecting section operatively connected to the second striker plate section.

5. The lock striker according to claim 4, wherein the connecting section is received in a receptacle that is situated on the second striker plate section, wherein a damping means is situated on the connecting section and/or the receptacle.

6. The lock striker according to claim 5, wherein the spring means has a first end section and a second end section, and the first end section is fastened by a first end section receiving means and the second end section is fastened by a second end section receiving means to the first extreme end and to the second extreme end respectively.

7. The lock striker according to claim 6, wherein the striker has a first striker limb and, parallel to the first striker limb, a second striker limb, the first and second striker limbs are oriented symmetrically with respect to one another and with respect to a respective edge section of the second striker plate section, and the striker section projects orthogonally with respect to said striker limbs.

8. The lock striker according to claim 7, wherein, between the first striker limb and the second striker limb, at least one aperture is situated in the second striker plate section, the at least one aperture is arranged in alignment with at least one aperture situated in the first striker plate section.

9. A motor vehicle body lock, having a lock striker according to claim 8.

10. A motor vehicle, having at least one motor vehicle body lock according to claim 9.

11. The lock striker according to claim 1, wherein the stiffness of the striker plate in the direction of the load is at least two times less than in the direction orthogonal to the direction of the load.

* * * * *